(12) United States Patent
Ooba

(10) Patent No.: US 11,707,842 B2
(45) Date of Patent: Jul. 25, 2023

(54) ROBOT SYSTEM AND COORDINATE CONVERSION METHOD

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 547 days.

(21) Appl. No.: 16/684,303

(22) Filed: Nov. 14, 2019

(65) Prior Publication Data

US 2020/0164512 A1 May 28, 2020

(30) Foreign Application Priority Data

Nov. 27, 2018 (JP) .................................. 2018-221247
Jan. 25, 2019 (JP) .................................. 2019-011348

(51) Int. Cl.
*B25J 9/16* (2006.01)
*G05B 19/408* (2006.01)

(52) U.S. Cl.
CPC ........ *B25J 9/1664* (2013.01); *G05B 19/4086* (2013.01); *B25J 9/1692* (2013.01);
(Continued)

(58) Field of Classification Search
CPC ...... B25J 9/1692; B25J 13/081; B25J 9/1697; B25J 13/089; B25J 9/1664; B25J 13/088; B25J 9/1607; B25J 9/0093; G05B 19/4086; G05B 2219/33263; G05B 2219/39401; G05B 2219/39032; G05B 2219/40554;
(Continued)

(56) References Cited

U.S. PATENT DOCUMENTS 5,521,843 A 5/1996 Hashima et al.
5,617,335 A 4/1997 Hashima et al.
(Continued)

FOREIGN PATENT DOCUMENTS

EP 2497611 A2 9/2012
EP 2993002 A1 3/2016
(Continued)

OTHER PUBLICATIONS

Japanese Notice of Reasons for Refusal dated Mar. 16, 2021, for Japanese Patent Application No. 2019011348.
(Continued)

*Primary Examiner* — Khoi H Tran
*Assistant Examiner* — Tanner L Cullen
(74) *Attorney, Agent, or Firm* — Karceski IP Law, PLLC

(57) ABSTRACT

This robot system includes a sensor system, a robot, and a robot controller, in which the robot controller recognizes a robot coordinate system but does not recognize a sensor coordinate system of the sensor system, and the robot controller creates a conversion matrix for carrying out coordinate conversion in a plane including an X-axis and a Y-axis on sets of position coordinates obtained by the sensor system based on the sets of position coordinates of a plurality of objects or points obtained by the sensor system and sets of position coordinates in an X-axis direction and a Y-axis direction in a robot coordinate system corresponding to the plurality of objects or points.

13 Claims, 11 Drawing Sheets

(52) U.S. Cl.
 CPC .............. *G05B 2219/33263* (2013.01); *G05B 2219/50391* (2013.01)

(58) Field of Classification Search
 CPC ........... G05B 2219/40607; G05B 2219/50391; G05B 2219/39102; G05B 2219/39104; G05B 19/41815; G05B 19/4182; G06T 7/70; G06T 7/80
 See application file for complete search history.

(56) References Cited

U.S. PATENT DOCUMENTS

| | | | |
|---|---|---|---|
| 2005/0107920 A1* | 5/2005 | Ban | B25J 9/1692 700/245 |
| 2011/0029131 A1 | 2/2011 | Ban et al. | |
| 2012/0229620 A1 | 9/2012 | Ikeda et al. | |
| 2014/0081456 A1* | 3/2014 | Schaller | B25J 9/1692 700/251 |
| 2014/0156072 A1 | 6/2014 | Ban et al. | |
| 2016/0059419 A1 | 3/2016 | Suzuki | |
| 2016/0151915 A1 | 6/2016 | Nishi et al. | |
| 2016/0151916 A1* | 6/2016 | Kanno | B25J 9/1697 700/228 |
| 2017/0066133 A1* | 3/2017 | Ooba | G05B 19/4182 |
| 2017/0109856 A1* | 4/2017 | Inazumi | G06T 7/74 |
| 2017/0139407 A1* | 5/2017 | Sakaguchi | B25J 9/1697 |
| 2017/0270683 A1* | 9/2017 | Sakamoto | G06T 7/80 |
| 2018/0126557 A1 | 5/2018 | Gu et al. | |
| 2018/0250817 A1* | 9/2018 | Matsunaga | B25J 19/0025 |
| 2018/0304467 A1* | 10/2018 | Matsuura | B25J 9/1697 |
| 2019/0256300 A1* | 8/2019 | Shimamura | B25J 9/1692 |
| 2020/0023521 A1* | 1/2020 | Dan | B25J 9/1692 |
| 2020/0061837 A1 | 2/2020 | Gu et al. | |

FOREIGN PATENT DOCUMENTS

| | | |
|---|---|---|
| EP | 3020517 A2 | 5/2016 |
| JP | S60193013 A | 10/1985 |
| JP | S63104105 A | 5/1988 |
| JP | H08210816 A | 8/1996 |
| JP | H1190871 A | 4/1999 |
| JP | 2000006069 A | 1/2000 |
| JP | 2000181522 A | 6/2000 |
| JP | 4022843 B | 12/2007 |
| JP | 2010149267 A | 7/2010 |
| JP | 2010188439 A | 9/2010 |
| JP | 2011031346 A | 2/2011 |
| JP | 4763074 B | 8/2011 |
| JP | 2012187651 A | 10/2012 |
| JP | 2016052695 A | 4/2016 |
| JP | 2016101640 A | 6/2016 |
| WO | 9315376 A1 | 8/1993 |
| WO | 2016154995 A1 | 10/2016 |

OTHER PUBLICATIONS

Japanese Search Report by Registered Search Organization dated Mar. 4, 2021, for Japanese Patent Application No. 2019011348.

\* cited by examiner

ROBOT SYSTEM AND COORDINATE CONVERSION METHOD

CROSS-REFERENCE TO RELATED APPLICATIONS

This application is based on and claims priority to Japanese Patent Application No. 2018-221247, filed on Nov. 27, 2018, and to Japanese Patent Application No. 2019-011348, filed on Jan. 25, 2019, the contents of both of which are incorporated herein by reference in their entireties.

FIELD OF THE INVENTION

The present invention relates to a robot system and a coordinate conversion method.

BACKGROUND OF THE INVENTION

Traditionally, a robot system is known that includes a robot adapted to perform tasks on an object that is being moved by a transfer device, a robot controller adapted to control the robot, a vision system adapted to be controlled by the robot controller, and a measurement unit adapted to measure an amount of movement of the object moved by the transfer device, where the position of the object is detected within an image obtained by the vision system and the robot is controlled based on the position that has been detected and the amount of movement measured by the measurement unit (for example, see Publication of Japanese Patent No. 4022843).

SUMMARY OF THE INVENTION

A robot system of a first aspect includes a sensor system; a robot; and a robot controller which controls the robot, wherein the robot controller recognizes a robot coordinate system that is a coordinate system of the robot but does not recognize a coordinate system of the sensor system; and the robot controller conducts matrix creation processing to create a conversion matrix which conducts coordinate conversion, in a plane including an X-axis and a Y-axis, on a set of position coordinates obtained by the sensor system, based on each set of position coordinates of a plurality of objects or points obtained by the sensor system and each set of position coordinates in an X-axis direction and a Y-axis direction in the robot coordinate system, the set of position coordinates in the robot coordinate system corresponding to the plurality of objects or points.

A coordinate conversion method of a second aspect is a coordinate conversion method for converting a set of position coordinates detected by a sensor system into a set of position coordinates in a robot coordinate system recognized by a robot controller, the method including: creating a conversion matrix which conducts coordinate conversion, in a plane including an X-axis and a Y-axis, on the set of position coordinates obtained by the sensor system based on each set of position coordinates of a plurality of objects or points obtained by the sensor system and each set of position coordinates in an X-axis direction and a Y-axis direction in the robot coordinate system corresponding to the plurality of objects or points; and converting position coordinates detected by the sensor system by using the conversion matrix.

DESCRIPTION OF EMBODIMENT(S) OF THE INVENTION

A robot system according to a first embodiment will be described hereinbelow with reference to the drawings.

Figure 1:
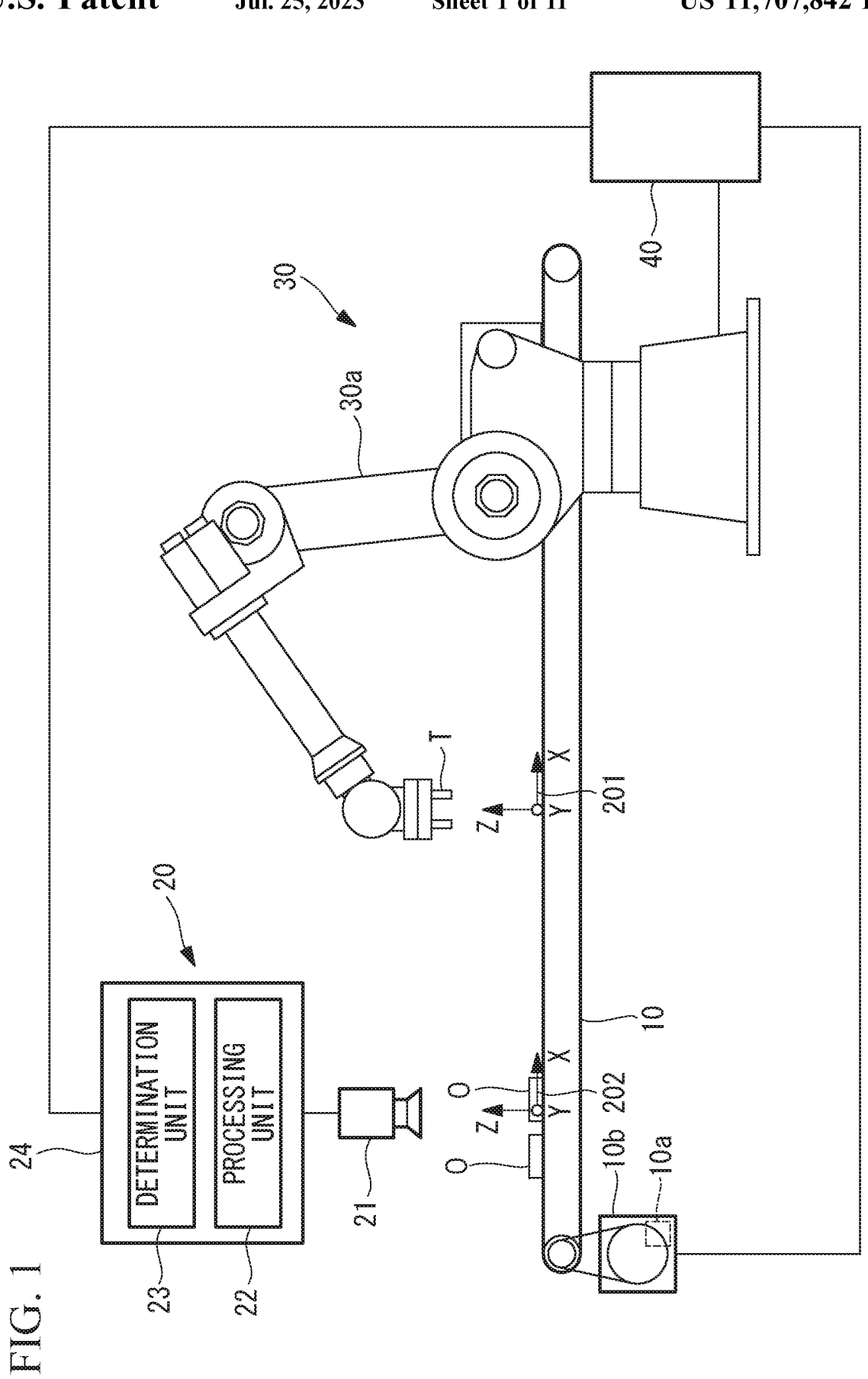
FIG. 1 is a diagram illustrating a configuration of a robot system of a first embodiment which uses a detection system.
Figure 2:
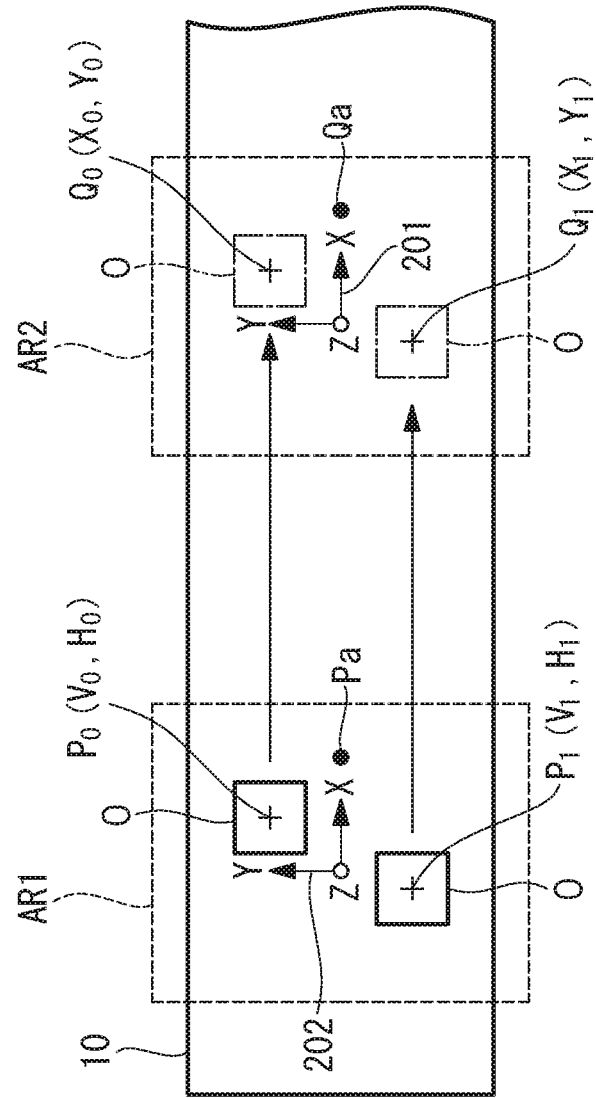
FIG. 2 is a block diagram of a control unit of the detection system of the first embodiment.

The robot system of this embodiment includes, as illustrated in FIGS. 1 and 2, a transfer device (moving means) 10 as moving means that moves articles (objects) 0; a sensor system 20; a robot 30; and a robot controller 40 that controls the robot 30.

The transfer direction of the transfer device 10 coincides with an X-axis direction of a robot coordinate system 201 that is a coordinate system of the robot 30, a direction perpendicular to a transfer surface of the transfer device 10 coincides with a Z-axis direction of the robot coordinate system 201, and a Y-axis direction of the robot coordinate system 201 is defined such that it coincides with a width direction parallel to a width of the transfer device 10. In this embodiment, the Z-axis direction is a vertical direction.

If the objects O are workpieces, the robot 30 carries out tasks such as unloading tasks and processing tasks on each of the objects O. The objects O may be holes formed in a single workpiece. In this case, the robot 30 carries out tasks such as processing and attachment of a component to each of the objects O.

The transfer device 10 includes a measurement unit 10a such as an encoder capable of detecting an amount of movement of the objects O that are being transferred. The measurement unit 10a is provided, for example, in a motor 10b that drives the transfer device 10. Alternatively, a roller may be provided at an end of the encoder and the roller may be pressed against a conveyor surface. The measurement unit 10a is connected to the robot controller 40 and the detection results that are detected by the measurement unit 10a are constantly sent to the robot controller 40.

The sensor system 20 is, for example, a system for carrying out inspection of the objects O that are transferred by the transfer device 10. The sensor system 20 includes a sensor 21, a processing unit 22 that processes data obtained by the sensor 21, and a determination unit 23 that carries out determination using the data that has been obtained and processed by the processing unit 22. The processing unit 22 and the determination unit 23 are provided, for example, in a sensor controller 24.

It should be noted that the processing unit 22 and the determination unit 23 may be incorporated into the sensor 21.

The sensor 21, which is, for example, a two-dimensional camera, three-dimensional camera, three-dimensional distance sensor, etc., should be capable of obtaining data for detecting the position of the object O. In this embodiment, the sensor 21 is arranged above the transfer device 10, and the optical axis of the sensor 21 is parallel to the Z-axis. In other words, the sensor 21 is arranged such that its optical axis is substantially perpendicular to the transfer surface of the transfer device 10.

The sensor controller 24 has a processor such as a CPU, a storage unit such as non-volatile storage, ROM, and RAM units, an input unit such as a keyboard and the like, a display unit, etc., and is connected to the robot controller 40. The processing unit 22 and the determination unit 23 are configured by the processor that operates based on programs stored in the storage unit.

The above-mentioned inspection may be any appropriate inspection, the processing unit 22 creates the processed data by performing known image processing, and the determination unit 23 carries out pass/fail judgment as part of, for example, component inspection or product inspection on each of the objects O based on the data that has been processed.

Also, the processing unit 22 or the determination unit 23 detects at least the positions of the objects O using the data that has been processed or has not been processed. It should be noted that the processing unit 22 or the determination unit 23 may detect the positions and orientations of the objects O.

Also, the position to be detected of each of the objects O may be a position of the object O in the data obtained by the sensor 21 or a position of the object O in the data that has been processed.

While the robot 30 is not limited to a robot of a particular type, the robot 30 of this embodiment is a vertical articulated robot that includes servo motors 31 (see FIG. 3) that individually drive multiple movable parts. It should be noted that the multiple movable parts constitute an arm 30a of the robot 30. The servo motors 31 each have an operation position detection device that detects the position of actuation thereof and the operation position detection device is, as an example, an encoder. The detected value that is detected by the operation position detection device is transmitted to the robot controller 40. The robot 30 may be a horizontal articulated robot, a multi-link robot, etc.

Figure 3:
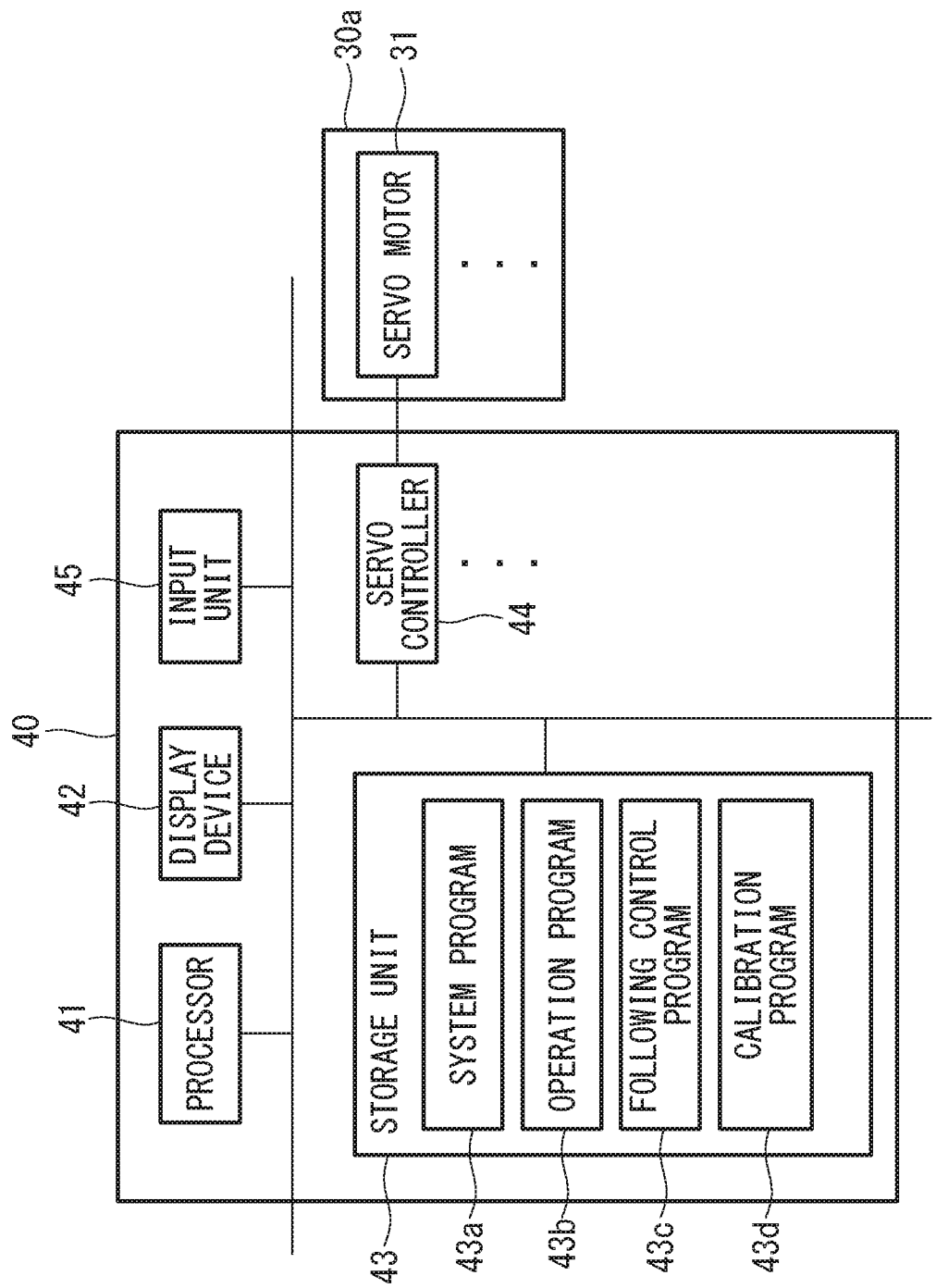
FIG. 3 is an explanatory diagram describing motion of an object detected by the detection system of the first embodiment.

The robot controller 40 includes, according to an example, as illustrated in FIG. 3, a processor 41 such as a CPU, a display device 42, a storage unit 43 that has a non-volatile storage unit, a ROM unit, a RAM unit, etc., a plurality of servo controllers 44 that corresponds to the servo motors 31 of the robot 30, respectively, and an input unit 45 such as an operation panel.

A system program 43a is stored in the storage unit 43 and the system program 43a is responsible for the basic functions of the robot controller 40. Also, an operation program 43b and a following control program 43c are stored in the storage unit 43 and the processor 41 controls the individual servo motors 31 of the robot 30 and a tool T provided at the distal end of the robot 30 based on these programs, by means of which the robot 30 performs tasks on the objects O that are being transferred by the transfer device 10. Also, a calibration program 43d is stored in the storage unit 43.

In this embodiment, a detection area AR1 by the sensor 21 is arranged on an upstream side in the transfer direction of the transfer device 10 relative to a work area AR2 of the robot 30, and the detection area AR1 and the work area AR2 do not overlap each other. The work area AR2 is not a range where the robot 30 is allowed to move but a range where the robot 30 carries out the above-mentioned task. It should be noted that the detection area AR1 and the work area AR2 may partly overlap each other.

The robot controller 40 is designed for controlling the robot 30 and, as a result, the robot controller 40 recognizes the robot coordinate system 201 that is the coordinate system of the robot 30. The robot controller 40 recognizes the positions and orientations of the individual movable parts of the arm 30a of the robot 30 and tool T in the robot coordinate system 201 and controls the individual servo motors 31 and the tool T at the distal end of the robot 30.

Here, in order to use the position data indicative of the position of each of the objects O detected by the sensor system 20 in control of the robot 30, it is necessary to perform calibration for defining a correspondence between the sensor coordinate system 202 of the sensor system 20 and the robot coordinate system 201, but the sensor system 20 does not have such a function.

As a compared example, a vision system for use in control of the robot 30 will be described. The vision system is manufactured by a robot manufacturing company that manufactures the robot 30 and the robot controller 40 and is specialized for control of the robot 30. In general, robot controller 40 and the vision system are created such that they are compatible with each other, and information, data, etc., obtained by the vision system are suitable for use on the robot controller 40. Also, a program for calibration is stored in the robot controller 40 and the vision system, and calibration is carried out in a semi-automatic or automatic fashion using a calibration jig having a dot pattern.

The pitches of the dot pattern are known. As a result, in the above-mentioned calibration, for example, the position of the camera relative to the calibration jig is identified by the control unit of the vision system based on the image of the dot pattern obtained by the camera of the vision system. Also, the position of the calibration jig in the robot coordinate system 201 is identified by the robot controller 40 by bringing a predetermined tool provided at a distal end of the robot 30 into contact with multiple locations of the dot pattern. In addition, various processes are performed such as definition of a correspondence between the scales of the two systems, cancelation of lens distortion, and the like. Such processes are performed in a semi-automatic or automatic fashion, the robot controller 40 recognizes the coordinate system of the vision system, and the robot controller 40 is allowed to recognize the position data of each of the object O in the robot coordinate system 201 based on the data from the vision system.

Meanwhile, the sensor system 20 is manufactured by a company specialized for manufacturing thereof, and the sensor 21 and the sensor controller 24 are for use in the inspection and not for use in control of the robot 30. This also applies to a case where the sensor system 20 is used in applications other than the inspection. The sensor system 20 of this type includes specifications and interfaces suited for its applications, and the processing performed in the sensor 21 and sensor controller 24 of the sensor system 20 is also specialized for the above-mentioned applications. As a result, the sensor system 20 cannot provide information, data, etc., suitable for control of the robot 30. Also, the sensor system 20 cannot identify the position of the sensor 21 using a calibration jig for use in control of the robot 30. In a situation where a program performing sophisticated calibration as described above cannot be used, employing a vision system for use in control of a robot is in normal cases considered.

The sensor system 20 and the sensor 21 specialized for specific applications such as inspection may in some cases have functions superior to those of the vision system provided for control of the robot 30. For example, such cases may include a case where the sensor 21 is a high-speed and/or high-precision sensor, a case where the processing in the processing unit 22 is high-speed and/or high-precision processing, and any other relevant cases. In this embodiment, calibration for using outputs of the sensor system 20 in control of the robot 30 is carried out.

It should be noted that there may be a sensor system 20 which is capable of deriving internal parameters such as lens distortion and deriving positional relationship with respect to the robot 30. However, it is not configured to adjust the coordinate systems using measured values that are measured by the measurement unit 10a, and the work area of the robot 30 resides in most cases within the range of the field of view.

It should also be noted in this embodiment that a state may be entered where internal parameters and external parameters of the sensor system 20 are determined using a tool provided as a dedicated tool by a company specialized for manufacturing of the sensor system 20. This embodiment is effective, for the relationship between the results of detection of the sensor system 20 and the robot coordinate system 201 is to be determined in this embodiment. It should be noted that, if the results of detection have already been converted into the units of millimeters in the sensor system 20, then the scale to be determined in this embodiment will ideally assume a value close to one.

Calibration Example 1

Figure 4:
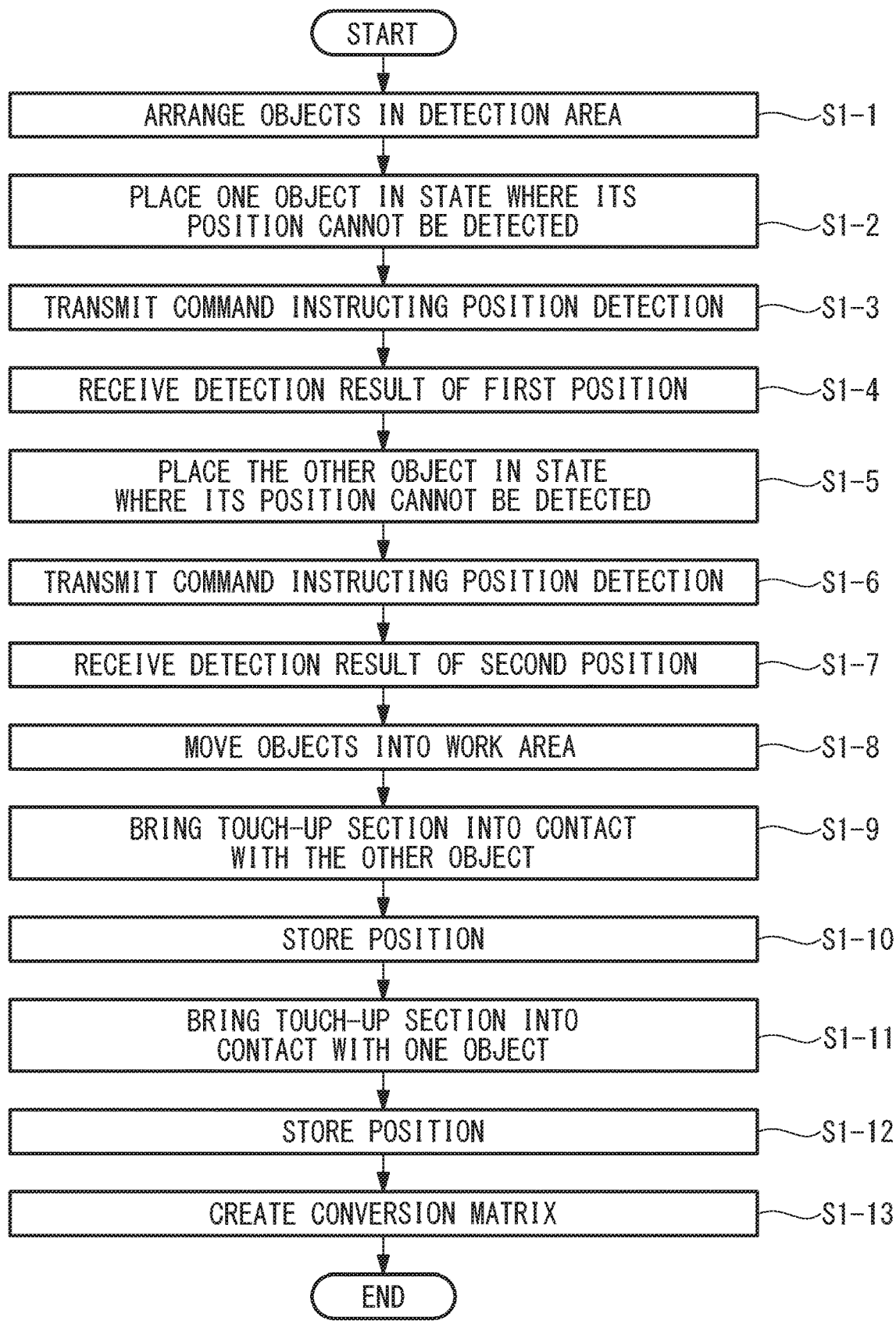
FIG. 4 is a flowchart illustrating an example of calibration using the detection system of the first embodiment.

The calibration will be described with reference to a flowchart of FIG. 4. First, two objects O are placed in a detection area AR1 on the transfer device 10 that is stopped (step S1-1). If the objects O are workpieces, the two objects O are placed on the transfer device 10 within the detection area AR1. It should be noted that, the two objects O may be two threaded holes provided in one single workpiece or may be two indicators provided on one single plate. It should also be noted that the objects O for the calibration may be different from objects on which the robot 30 performs a task. In this case, the position in the Z-axis direction of the object for the calibration should preferably correspond to the position in the Z-axis direction of the object on which the task of the robot 30 is performed. Also, a feature may not be necessarily provided on one workpiece. Two workpieces may be used. At this point, it is more preferable that the two objects are secured to the conveyor with a tape so that the relative relationship between these two workpieces does not change.

Subsequently, one of the two objects O is placed in a state where its position is not detected by the sensor system 20 (step S1-2), a command instructing detection of the position of the object O is transmitted in this state from the robot controller 40 to the sensor system 20 (step S1-3), and the robot controller 40 receives a detection result $P_0$ of the first position from the sensor system 20 (step S1-4).

Subsequently, the other object O is placed in a state where its position is not detected by the sensor system 20 (step S1-5), a command instructing detection of the position of the object O is transmitted in this state from the robot controller 40 to the sensor system 20 (step S1-6), and the robot controller 40 receives the detection result $P_1$ of the second position from the sensor system 20 (step S1-7).

In steps S1-2 and S1-5, a state where the positions of the objects O are not detected is realized, for example, by hiding the object O with a cloth.

Subsequently, the two objects O are moved by the transfer device 10 until they reside within the work area AR2 and the transfer device 10 is stopped (step S1-8). In addition, an end (touch-up section) of the tool attached to the robot 30 is brought into contact with a predetermined position of the other object O (step S1-9), and the position of the end of the tool at this point (the set of position coordinates $Q_0$ in the robot coordinate system 201) is stored in the storage unit 43 of the robot controller 40 (step S1-10). It should be noted that the touch-up section may be the distal end of the robot 30.

Also, the end of the tool of the robot 30 (touch-up section) is brought into contact with a predetermined position of the one object O (step S1-11) and the position of the end of the tool at this point (the set of position coordinates $Q_1$ in the robot coordinate system 201) is stored in the storage unit 43 of the robot controller 40 (step S1-12). The above-mentioned predetermined positions are preferably positions that corresponds to the positions that has been detected by the sensor system 20.

Subsequently, a conversion matrix for determining a position (Xa, Ya), which is represented in the robot coordinate system 201, of the position of any appropriate point Pa detected by the sensor system 20 is created (step S1-13).

The conversion matrix is created by the robot controller 40 based on the calibration program 43d and, for example, in accordance with the following process.

First, a unit vector is created based on the relationship between the positions of the points $P_0$ and $P_1$ that have been detected by the sensor system 20, i.e., the set of position coordinates describing the point $P_0$ that has been detected in the sensor coordinate system 202 and the set of position coordinates describing the point $P_1$ that has been detected in the sensor coordinate system 202, and a sensor X-Y coordinate system that corresponds to this unit vector is set. For example, the sensor X-Y coordinate system is configured in a plane that is parallel to the X-axis and the Y-axis of the sensor coordinate system 202.

As one example, based on the relationship between the set of position coordinates describing the point $P_0$ that has been detected in the sensor coordinate system 202 and the set of the position coordinates describing the point $P_1$ that has been detected in the sensor coordinate system 202, the unit vector of the X-axis and the unit vector of the Y-axis are created with the point $P_0$ used as the origin, and the sensor X-Y coordinate system that corresponds to the unit vectors is defined. A certain appropriate point Pa of the sensor system 20 is converted into the coordinates in the above-described sensor X-Y coordinate system.

Also, a robot X-Y coordinate system that corresponds to the sensor X-Y coordinate system is set in the robot coordinate system 201 based on the relationship between the set of position coordinates of the point $Q_0$ in the robot coordinate system 201 and the set of position coordinates of the point $Q_1$, and the set of position coordinates of the point Qa represented in the robot coordinate system 201 is determined so that it corresponds to the point Pa. The set of the position coordinates of the point Qa takes into account the scale "s" (mm/pixel) that is derived from the positional relationship between the points $P_0$ and $P_1$ and the positional relationship between the points $Q_0$ and $Q_1$. For example, the robot X-Y coordinate system is set in a plane that is parallel to the X-axis and the Y-axis of the robot coordinate system 201. Here, the definition of the correspondence is performed by additionally using the amount of movement measured by the measurement unit 10*a*.

For example, the robot X-Y coordinate system that corresponds to the above-described sensor X-Y coordinate system is defined with the point $Q_0$ used as the origin based on the relationship between the set of position coordinates of the point $Q_0$ and the set of position coordinates of the point $Q_1$ in the robot coordinate system 201. By putting together the robot X-Y coordinate system and the point Pa represented in the above-described sensor X-Y coordinate system, it is made possible to determine a coordinate position (Xa, Ya) in the robot X-Y coordinate system of the point Pa. The scale "s" per pixel is derived from the positional relationship between the points $P_0$ and $P_1$ and the positional relationship between the points $Q_0$ and $Q_1$. Also, the amount of movement measured by the measurement unit 10*a* is used.

Subsequently, the conversion matrix for converting the set of position coordinates of the point Pa represented in the sensor coordinate system 202 into the set of position coordinates of the point Qa represented in the robot coordinate system 201 can be determined using the correspondence relationship between the set of position coordinates of the point Pa and the set of position coordinates of the point Qa that has been determined.

It should be noted that it is also possible to determine the conversion matrix analytically by touching up three points using the following expression (1) without using the above-described scheme, i.e., the scheme of reducing the touch-up points to two using the relationship in terms of arrangement of the objects O and constraints on the direction of movement. Also, it is further made possible to numerically determine the conversion matrix through schemes such as a least squares method by touching up three or more points.

Mathematical expression 1

$$\begin{bmatrix} Va \\ Ha \\ 1 \end{bmatrix} = \begin{bmatrix} H_{11} & H_{12} & T_x \\ H_{21} & H_{22} & T_y \\ 0 & 0 & 1 \end{bmatrix} \begin{bmatrix} Xa \\ Ya \\ 1 \end{bmatrix} \quad (1)$$

Note that H is a mathematical expression element for rotational movement and T is a mathematical expression element for translational movement.

Calibration Example 2

Figure 5:
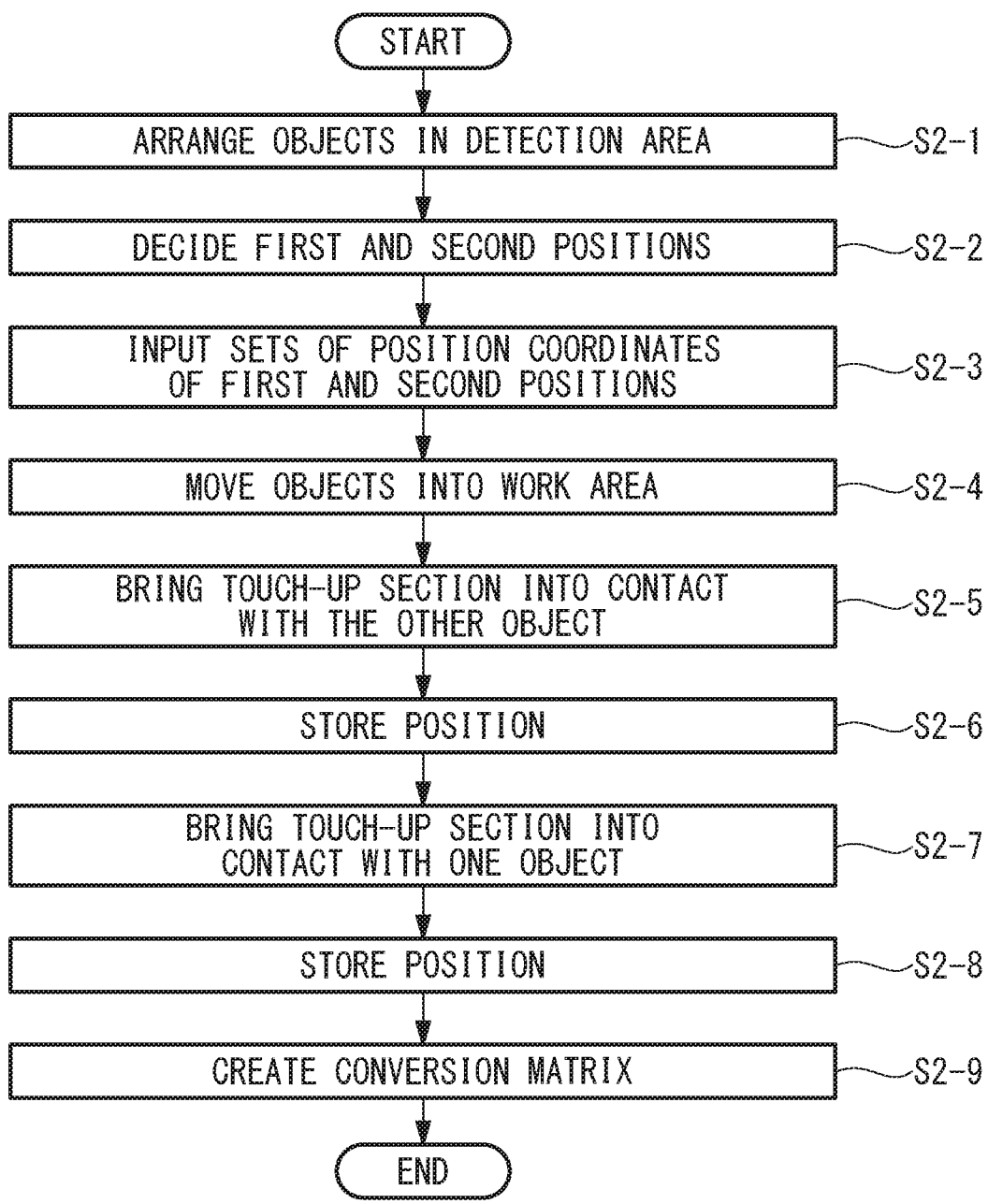
FIG. 5 is a flowchart illustrating a modified example of the calibration using the detection system of the first embodiment.

The calibration will be described with reference to a flowchart of FIG. 5. First, in the same manner as in Calibration Example 1, two objects O are arranged within the detection area AR1 on the transfer device 10 that is stopped (step S2-1).

Subsequently, the operator looks at the image obtained by the sensor 21 or the data thereof that has been processed on the display unit of the sensor system 20 or any other display devices and decides the first and second positions in the sensor coordinate system 202 with which the tool of the robot 30 is to be brought into contact (step S2-2), and thereby the sets of position coordinates of the first point $P_0$ and the second point $P_1$ are acquired using the sensor system 20. For example, in a case where the position of a pointer that appears on the display device of the sensor system 20 is indicated on the same display device, the sets of position coordinates of the points $P_0$ and $P_1$ are obtained by making the pointer move to the points $P_0$ and $P_1$. It is preferable that the first point $P_0$ and the second point $P_1$ correspond to a height of the task conducted by the robot 30.

Subsequently, the operator inputs the position coordinates of the first point $P_0$ and the second point $P_1$ into the robot controller 40 using the input unit 45 (step S2-3). It should be noted that, in step S2-3, the set of position coordinates of the first point $P_0$ and the set of position coordinates of the second point $P_1$ that have been decided in step S2-2 may be transmitted from the sensor system 20 to the robot controller 40.

Subsequently, steps S2-4 to S2-9, that are the same as or similar to the steps S1-8 to S1-13 of Calibration Example 1, are performed and the conversion matrix for determining the position (Xa, Ya) represented in the robot coordinate system 201 of the position of any appropriate point Pa detected by the sensor system 20 is created.

When the conversion matrix that has been created is used, the position coordinates that have been detected by the sensor system 20 can be converted into the position coordinates in the robot coordinate system. In other words, the calibration to define the correspondence between the sensor coordinate system 202 and the robot coordinate system 201 is completed.

It should be noted that the above-described conversion matrix is tuned to carry out the coordinate conversion that includes, as one example, rotation about the Z-axis perpendicular to the X-axis and the Y-axis. Also, the conversion matrix of this embodiment does not carry out the coordinate conversion that includes rotation about the X-axis or the Y-axis. As a result, it is made possible to readily and reliably carry out the calibration with regard to multiple objects O whose positions in the Z-axis direction does not significantly differ from each other.

After the calibration has been carried out as described above, the robot controller 40 controls the robot 30 and the tool T so as to perform a predetermined task on each of the objects O by using at least the position data of each object O obtained by the sensor system 20 and the amounts of movement of the objects O moved by the transfer device 10 obtained by the measurement unit 10*a*.

In this embodiment, since the robot controller 40 recognizes the position of the touch-up section provided at the distal end of the robot 30, the positions of the objects O in the robot coordinate system 201 are obtained by bringing the touch-up section into contact with the objects O. Also, the conversion matrix for carrying out the coordinate conversion in the plane that includes the X-axis and the Y-axis can be created based on the sets of position coordinates of the objects O detected or obtained by the sensor system 20 and the sets of position coordinates of the objects O in the X-axis direction and the Y-axis direction in the robot coordinate system 201 obtained by the contact with the touch-up section. In this manner, since the conversion matrix can be created without involving sophisticated processes, it is made possible to readily and reliably carry out calibration between the sensor system 20 and the robot 30 manufactured by a manufacturing company of an inspection device, a manufacturing company of a high-precision measurement instrument, or any other relevant company.

Also, in this embodiment, the conversion matrix carries out coordinate conversion that includes rotation about the Z-axis perpendicular to the X-axis and the Y-axis.

More specifically, the conversion matrix carries out the coordinate conversion that includes rotation about the Z-axis and does not carry out the coordinate conversion that includes rotation about the X-axis and the Y-axis. In this case, it is made possible to readily and reliably carry out calibration to perform a task by the robot 30 on the multiple objects O whose positions in the Z-direction do not significantly differ from each other.

Also, in this embodiment, the conversion matrix is created by using the sets of position coordinates of multiple objects O that have been detected or obtained by the sensor system 20; the sets of position coordinates obtained by bringing the touch-up section into contact with the multiple objects O that have been moved by the transfer device 10 after the sets of position coordinates have been obtained by the sensor system 20; and the amount of movement measured by the measurement unit 10a.

The detection area of the sensor system 20 that is manufactured by a manufacturing company of an inspection device, a manufacturing company of a high-precision measurement instrument, or any other relevant company is in many cases different from the work area by the robot 30. In this aspect, even in a case where the detection area and the work area are different from each other, it is possible to create the conversion matrix that converts the position coordinates that have been detected by the sensor system 20 into the position coordinates in the robot coordinate system 201 by using the amount of movement measured by the measurement unit 10a.

Also, two objects O are used in the calibration in this embodiment.

This robot system is capable of carrying out practically accurate calibration to perform tasks by the robot 30 on the multiple objects O whose positions in the Z-axis direction do not significantly differ from each other even when two objects O are to be handled. Since two objects are used in the calibration, the time needed to carry out the calibration can be shortened. This makes it possible to carry out the calibration appropriately in accordance with the types, sizes, etc., of the objects O on which the robot 30 performs the tasks when the types, sizes, etc., change frequently.

It should be noted that, in the robot system of this embodiment, the robot controller 40 may recognize whether the sensor coordinate system 202 of the sensor system 20 is a right-hand coordinate system or a left-hand coordinate system based on inputs to the input unit 45. According to this configuration, the robot controller 40 can be readily and reliably adjusted to the position detection of the sensor system 20 regardless of whether the sensor system 20 employs the right-hand coordinate system or the left-hand coordinate system.

Also, in this embodiment, it is preferable that the dimensional variation in the Z-axis direction of the multiple objects O is small. This robot system is configured to create the conversion matrix for carrying out the coordinate conversion in the plane including the X-axis and the Y-axis and, in a case where the dimensional variations of the multiple objects O in the Z-axis direction are small relative to each other, the robot controller 40 can be more reliably adjusted to the position detection of the sensor system 20.

It should be noted that, in the embodiments, it is also possible to use, as the moving means that moves the object O, in place of the transfer device 10, a robot that moves the object O, a moving dolly that moves the object O placed thereon as a result of the movement of the same moving dolly, or any other relevant units. If a robot is used, in place of the measured value of the measurement unit 10a, a detected value that is detected by the operation position detection device of each servo motor of the robot is used as the measurement value of the amount of movement of the object O. In a case where a moving dolly is used, in place of the measurement unit 10a, a detected value of an encoder of a motor that drives a placement dolly is used as the measured value of the amount of movement of the object O.

Also, in place of the measurement unit 10a, an indicator provided on the transfer device 10, the amount of movement of the object O or the like may be detected by a sensor such as a two-dimensional camera. In this case, the sensor such as a two-dimensional camera functions as the measurement unit.

Also, in the above-described embodiment, the sensor 21 may be supported by the robot 30 or another robot. In this case as well, the conversion matrix can be created by the same process as the one that has been described in the foregoing. It should be noted that, in this case as well, the optical axis of the sensor 21 is preferably parallel to the Z-axis. The position of the sensor 21 can be determined based on operation information of the robot 30 or the other robot.

A robot system according to a second embodiment will be described hereinbelow with reference to the drawings.

The second embodiment illustrates another example of calibration for using the outputs of the sensor system 20 in control of the robot 30 explained in the first embodiment, the other features of which are the same as those in the first embodiment. In the second embodiment as well, the transfer device (moving means) 10, the sensor system 20, robot 30, and the robot controller 40 are used, which are the same ones as those in the first embodiment. The same features as those in the first embodiment are assigned the same reference signs with explanations thereof omitted.

Figure 6:
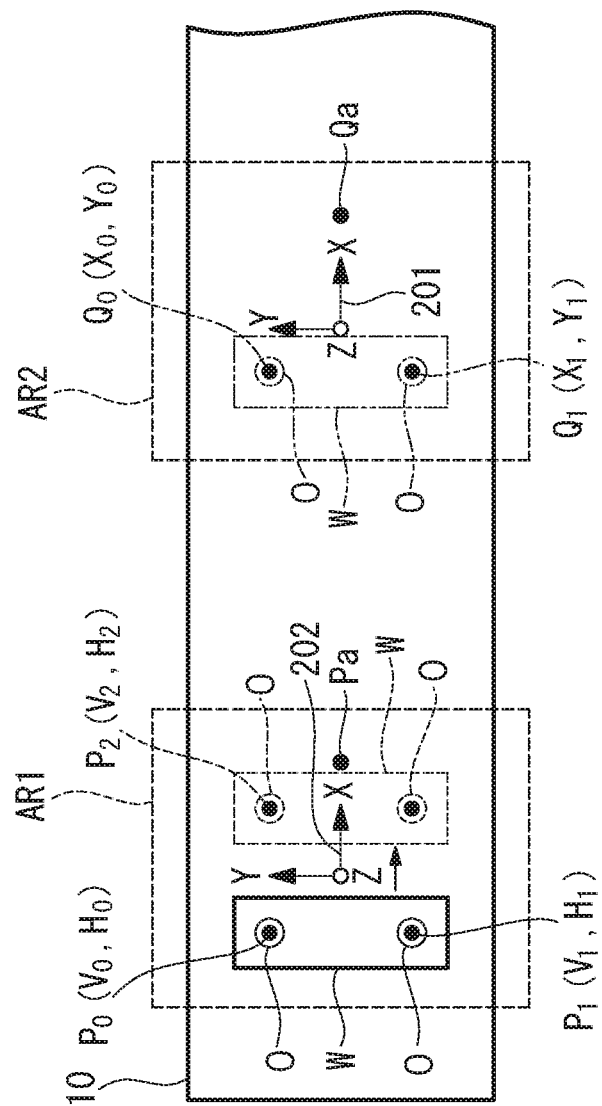
FIG. 6 is an explanatory diagram describing motion of an object detected by a detection system of a second embodiment.

In the second embodiment, as illustrated in FIG. 6, for example, one workpiece W is placed on the transfer device 10, and the profiles, through-holes, indicators, etc., provided at one end and the other end in the Y-axis direction of the workpiece W are detected as the objects O. The processing unit 22 or the determination unit 23 of the sensor controller 24 detects at least the positions of the objects O. It should be noted that the processing unit 22 or the determination unit 23 may detect the positions and orientations of the objects O.

In the second embodiment, calibration for using the outputs of the sensor system 20 in control of the robot 30 is carried out in accordance with the following process. Matters that are not specifically explained are to be processed in the same manner as in the first embodiment and modified examples similar to the first embodiment will also be adopted.

Calibration Example 1

Figure 7:
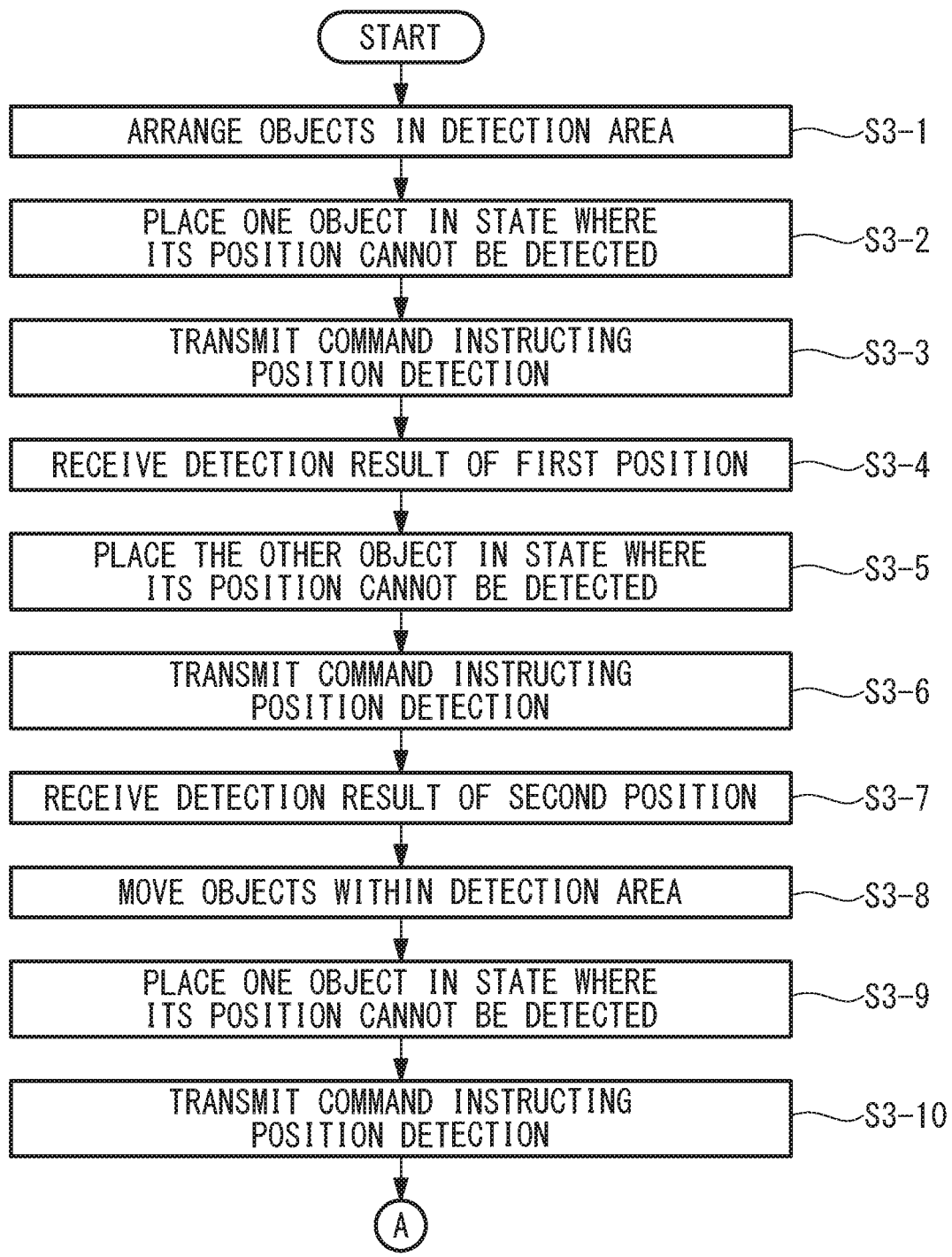
FIG. 7 is a flowchart illustrating an example of calibration using the detection system of the second embodiment
Figure 8:
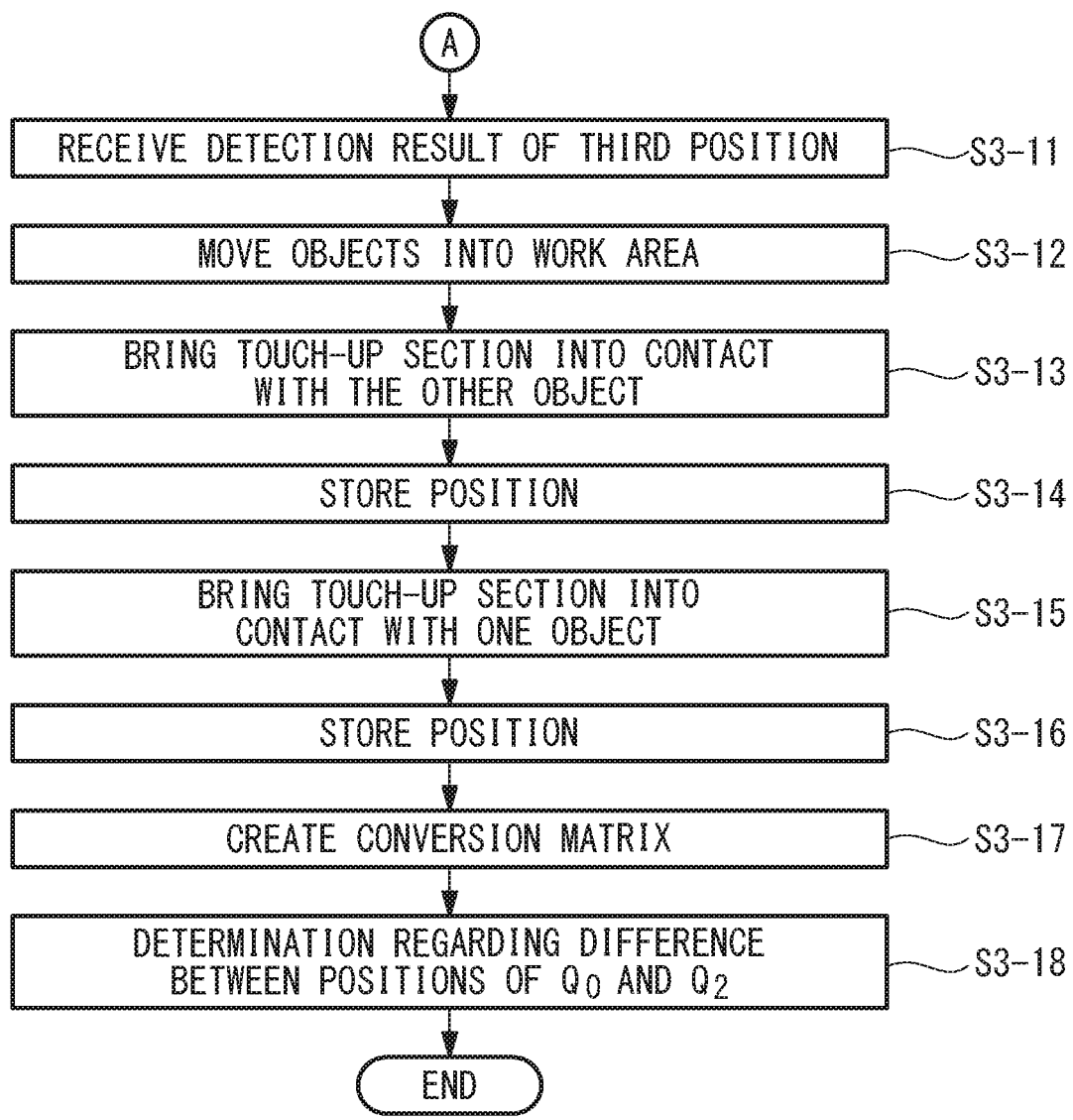
FIG. 8 is a flowchart illustrating an example of calibration using the detection system of the second embodiment

The calibration will be described with reference to flowcharts of FIGS. 7 and 8. First, two objects O that are away from each other in the Y-axis direction are arranged within the detection area AR1 on the transfer device 10 that is stopped (step S3-1). It is also possible to use the workpiece W illustrated in FIG. 10. In this case, the two objects O aligned with each other in the X-axis direction reside at one end in the Y-axis direction, and one of them and an object O arranged at the other end in the Y-axis direction should be arranged in the detection area AR1.

Subsequently, one of the two objects O away from each other in the Y-axis direction is placed in a state where its position is not detected by the sensor system 20 (step S3-2), a command instructing detection of the position of the object O is transmitted from the robot controller 40 to the sensor system 20 in this state (step S3-3), and the robot controller 40 receives the detection result $P_0$ of the first position from the sensor system 20 (step S3-4).

Subsequently, the other object O is placed in a state where its position is not detected by the sensor system 20 (step S3-5), a command instructing detection of the position of the object O is transmitted from the robot controller 40 to the sensor system 20 in this state (step S3-6), and the robot controller 40 receives the detection result $P_1$ of the second position from the sensor system 20 (step S3-7).

Subsequently, the objects O are moved by the transfer device 10 within the detection area AR1 (step S3-8). In this state, for example, one object O is placed in a state where its position is not detected by the sensor system 20 (step S3-9), a command instructing detection of the position of the object O is transmitted from the robot controller 40 to the sensor system 20 in this state (step S3-10), and the robot controller 40 receives the detection result $P_2$ of the third position from the sensor system 20 (step S3-11).

Subsequently, the objects O are moved by the transfer device 10 until they reside within the work area AR2 and the transfer device 10 is stopped (step S3-12). In addition, the end (touch-up section) of the tool attached to the robot 30 is brought into contact with a predetermined location of the other object O (step S3-13) and the position of the end of the tool at this point (the position coordinates $Q_0$ in the robot coordinate system 201) is stored in the storage unit 43 of the robot controller 40 (step S3-14).

Also, the end of the tool of the robot 30 (touch-up section) is brought into contact with a predetermined location of the one object O (step S3-15) and the position of the end of the tool at this point (the position coordinates $Q_1$ in the robot coordinate system 201) is stored in the storage unit 43 of the robot controller 40 (step S3-16).

Subsequently, a conversion matrix for determining a position (Xa, Ya) represented in the robot coordinate system 201 of the position of a certain appropriate point Pa that has been detected by the sensor system 20 is created (step S3-17). At this point, the sets of position coordinates of the points $P_0$ and $P_1$ are also converted into the sets of position coordinates of the points $Q_0$, $Q_1$ in the robot coordinate system 201.

Also, the robot controller 40 calculates the set of position coordinates $Q_2$ of the detection result $P_2$ in the robot coordinate system 201 using the conversion matrix, and determines whether or not the difference between the positions of the points $Q_0$ and $Q_2$ in the X-axis direction that is the transfer direction of the robot coordinate system 201 falls within a predetermined reference range (step S3-18). For example, it is determined whether or not a determination coefficient A of the following expression (2) falls within the reference range:

Mathematical expression 2

$$A = X_2 - X_0 \qquad (2)$$

Note that $X_0$ is the position of the point $Q_0$ in the X-axis direction and $X_2$ is the position of the point $Q_2$ in the X-axis direction. For example, the reference range is a range exceeding 0. The reference range can be specified as appropriate.

By step S3-18, the robot controller 40 can define the correspondence between the X-axis direction of the sensor coordinate system 202 and the X-axis direction of the robot coordinate system 201. In other words, the robot controller 40 is allowed to determine whether the coordinate system is a left-hand coordinate system or a right-hand coordinate system without input by an operator or the like.

Figure 10:
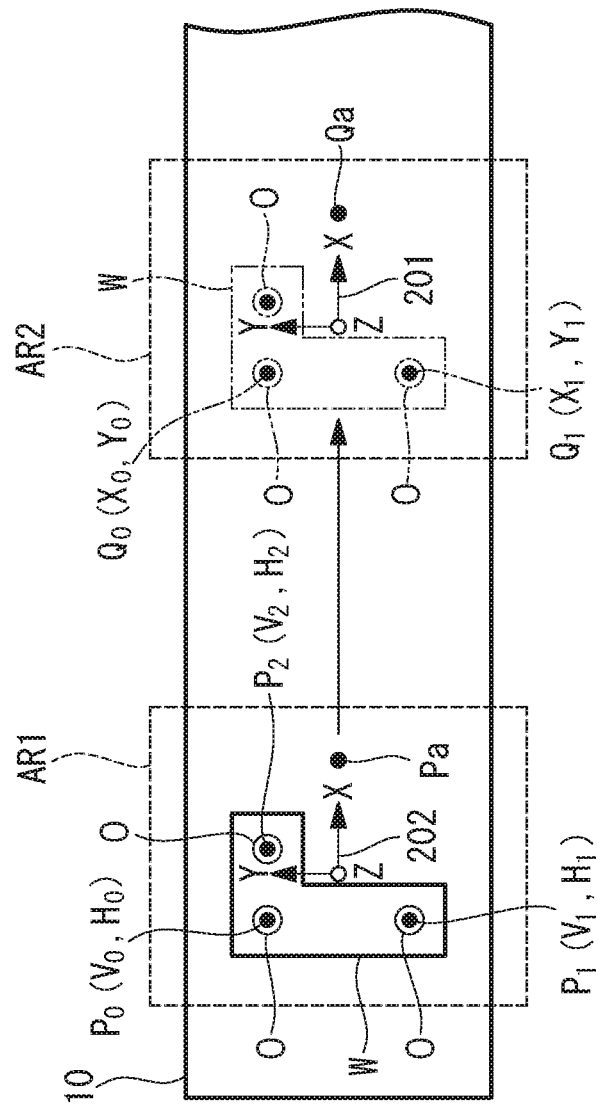
FIG. 10 is an explanatory diagram describing motion of another object detected by a detection system of a second embodiment.

It should be noted that, in step S3-8 to S3-11, the robot controller 40 may receive the detection result $P_2$ of the position of the other object O illustrated in FIG. 10 from the sensor system 20 without moving the object O by the transfer device 10. In the case of FIG. 10, the position of the other object O differs from the first position in the X-axis direction that is the transfer direction of the transfer device 10.

Calibration Example 2

Figure 9:
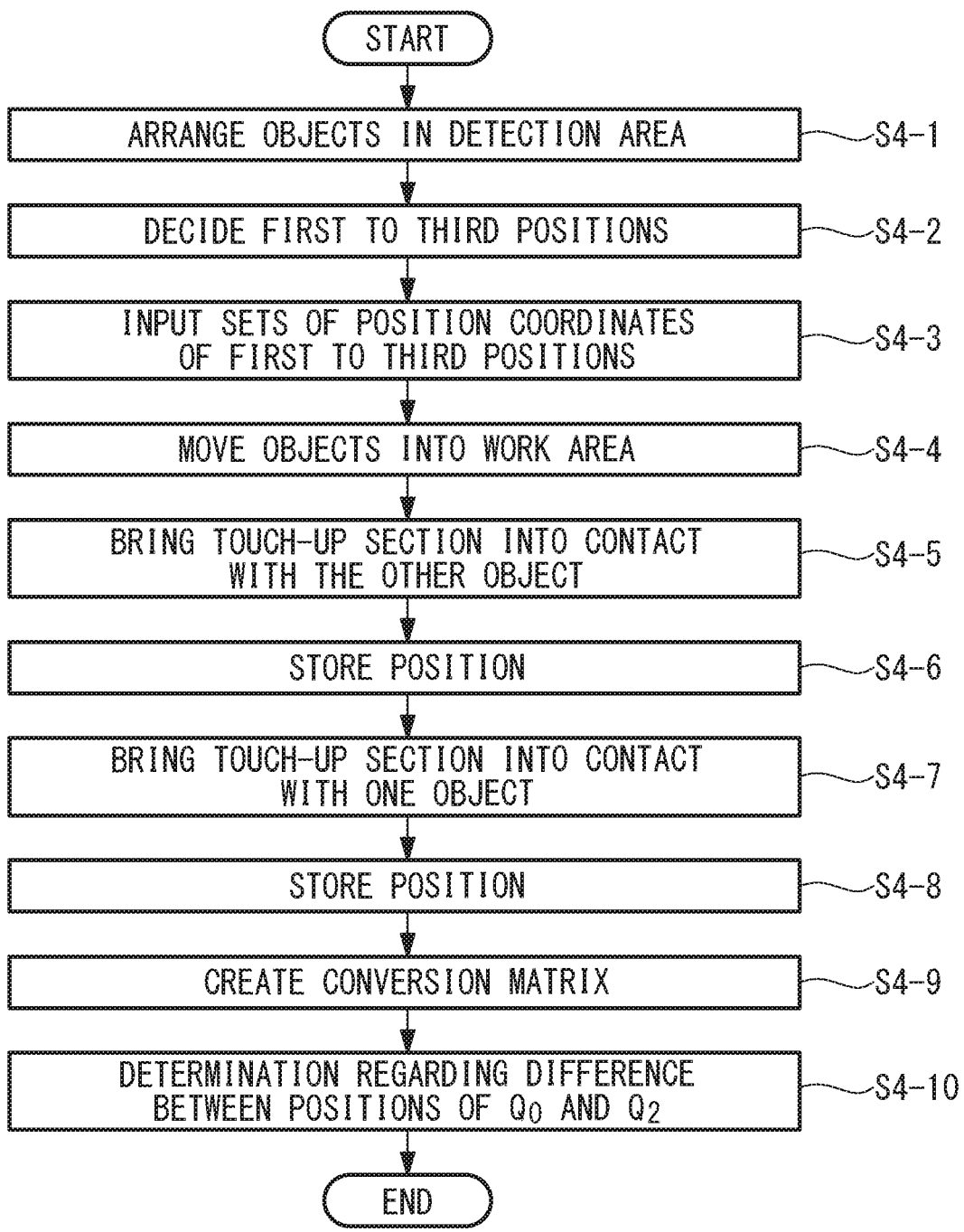
FIG. 9 is a flowchart illustrating a modified example of calibration using the detection system of the second embodiment

The calibration will be described with reference to a flowchart of FIG. 9. First, in the same manner as in Calibration Example 1, the workpiece W is placed in the detection area AR1 on the transfer device 10 that is stopped (step S4-1).

Subsequently, the operator looks at the image obtained by the sensor 21 or data thereof that has been processed on the display unit of the sensor system 20 or any other display device or the like, decides the positions in the sensor coordinate system 202 of the first object O, the second Object O, and the third object O in the workpiece W with which the tool of the robot 30 is to be brought into contact (step S4-2), and acquires the sets of position coordinates of the first point $P_0$, the second point $P_1$, and the third point $P_2$ using the sensor system 20. The point $P_2$ differs in its position from the point $P_0$ in the transfer direction of the transfer device 10. It should be noted that the set of position coordinates of the third point $P_2$ may be acquired after the objects O have been moved by the transfer device 10.

Subsequently, steps S4-4 to S4-9 that are the same as or similar to the steps S3-12 to S3-17 of Calibration Example 1 are performed and the conversion matrix for determining the position (Xa, Ya) represented in the robot coordinate system 201 of the position of a certain appropriate point Pa detected by the sensor system 20 is created.

Also, in the same manner as step S3-18 of Calibration Example 1, the set of position coordinates $Q_2$ of the detection result $P_2$ of the third object O in the robot coordinate system 201 is calculated and it is determined whether or not the difference between the positions of the points $Q_0$ and $Q_2$ in the X-axis direction that is the transfer direction of the robot coordinate system 201 falls within a predetermined reference range (step S4-10).

In the second embodiment, for example, if a correspondence is defined between the X-axis direction of the sensor coordinate system 202 and the transfer direction of the transfer device 10, then the difference will be given as a positive value corresponding to a value obtained by subtracting the value of X of the position coordinates of the point $Q_0$ from the value of X of the position coordinates of the point $Q_2$ (the position coordinates that corresponds to the second set of position coordinates). As a result, the fact that the X-axis direction of the sensor coordinate system 202 is in agreement with the X-axis direction of the robot coordinate system 201 is recognized by the robot controller 40 based on the difference between the positions of $Q_0$ and $Q_2$.

It should be noted that the transfer direction of the transfer device 10 corresponds to the X-axis direction of the robot coordinate system 201 and the X-axis direction of the sensor coordinate system 202 in this embodiment. Meanwhile, if the transfer direction corresponds to the X-axis direction of the robot coordinate system 201 and the Y-axis direction of the sensor coordinate system 202, then the transfer direction may correspond to the Y-axis direction of the robot coordinate system 201 and the Y-axis direction of the sensor coordinate system 202 in some cases depending on the device configurations.

In the second embodiment, the direction in which the transfer device 10 moves the objects O is the X-axis direction of the robot coordinate system 201. When this configuration is used, a second set of position coordinates that only differ in the position in the transfer direction can be readily and reliably obtained by moving the object O by the transfer device 10.

The following aspects are derived from the above-described embodiments.

The robot system of the first aspect includes a sensor system, a robot, and a robot controller configured to control the robot, in which the robot controller recognizes a robot coordinate system that is a coordinate system of the robot but does not recognize a coordinate system of the sensor system; and the robot controller carries out matrix creation processing to create a conversion matrix for carrying out coordinate conversion in a plane including an X-axis and a Y-axis on sets of position coordinates obtained by the sensor system based on sets of position coordinates of a plurality of objects or points obtained by the sensor system and sets of position coordinates in an X-axis direction and a Y-axis direction in the robot coordinate system corresponding to the plurality of objects or points.

In this aspect, the conversion matrix that carries out the coordinate conversion in a plane that includes the X-axis and the Y-axis can be created based on the sets of position coordinates of the objects that have been detected by the sensor system and the sets of position coordinates of the objects in the X-axis direction and the Y-axis direction in the robot coordinate system. In this manner, since the conversion matrix can be created without involving sophisticated processes, it is made possible to readily and reliably carry out the calibration between the robot and the sensor system manufactured by a manufacturing company of an inspection device, a manufacturing company of a high-precision measurement instrument, or any other relevant company.

In the above-described aspect, preferably, the robot controller creates the conversion matrix based on the sets of position coordinates of the plurality of objects or points and sets of the position coordinates in the robot coordinate system of the plurality of objects or points obtained by bringing a touch-up section provided at a distal end of the robot into contact with positions corresponding to the plurality of objects or points.

In this aspect, since the robot controller recognizes the position of the touch-up section provided at the distal end of the robot, the positions of the objects in the robot coordinate system can be obtained by bringing the touch-up section into contact with the plurality of objects. By virtue of this, the conversion matrix can be created without involving sophisticated processes or tasks.

In the above-described aspect, preferably, the robot controller creates the conversion matrix based on the sets of position coordinates of the plurality of objects or points and the sets of position coordinates in the robot coordinate system of the plurality of objects or points obtained based on detection data of a sensor in which a correspondence of coordinate systems is defined with respect to the robot.

In this aspect, the sets of position coordinates of the plurality of objects or points in the robot coordinate system can be obtained without much time and labor based on the detection data of the sensor in which the correspondence is defined between the coordinate systems. By virtue of this, the conversion matrix can be created without involving sophisticated processes or tasks.

In the above-described aspect, preferably, the conversion matrix carries out the coordinate conversion including rotation about a Z-axis perpendicular to the X-axis and the Y-axis.

As one example, in a case where the conversion matrix carries out the coordinate conversion that includes rotation about the Z-axis and carries out the coordinate conversion that does not include rotation about the X-axis and the Y-axis, it is made possible to readily and reliably carry out calibration to carry out tasks by the robot on multiple objects whose positions in the Z-direction do not significantly differ from each other.

The above-described robot system preferably includes a moving means configured to move the object and a measurement unit configured to measure an amount of movement of the object that is moved by the moving means, in which the robot controller creates the conversion matrix, in the matrix creation processing, by using the sets of position coordinates of the plurality of objects or points obtained by the sensor system; the sets of position coordinates obtained by bringing the touch-up section into contact with positions corresponding to the plurality of objects or points moved by the moving means after the sets of position coordinates have been obtained by the sensor system; and the amount of movement measured by the measurement unit.

A detection area of a sensor system manufactured by a manufacturing company of an inspection device, a manufacturing company of a high-precision measurement instrument, or any other relevant company differs in many cases from the work area by the robot. In this aspect, even when the detection area and the work area differ from each other, it is made possible to create a conversion matrix that converts the position coordinates detected by the sensor system into the position coordinates in the robot coordinate system using the amount of movement measured by the measurement unit.

In the above-described aspect, two objects or points are preferably involved.

The above-described robot system is capable of carrying out practically accurate calibration to perform tasks on multiple objects whose positions in the Z-axis direction do not significantly differ from each other even when two objects are involved. Since two objects are used in the calibration, the time needed to perform the calibration can be shortened. This makes it possible to appropriately carry out the calibration in accordance with the types, sizes, etc., of the objects on which the robot performs tasks when the types, sizes, etc., change frequently.

In the above-described aspect, preferably, a moving means configured to move the object is provided, in which the robot controller receives second set of position coordinates obtained by the sensor system, the second set of position coordinates identifying positions different than each other in a moving direction of the moving means with respect to the position coordinates obtained by the sensor system; performs coordinate conversion on at least one of the sets of position coordinates and the second set of position coordinates by using the conversion matrix; and performs determination processing to determine whether or not a difference in position in the X-axis direction between the set of position coordinates and the second set of position coordinates subjected to the coordinate conversion is equal to or smaller than a reference value.

For example, if a value obtained by subtracting the value of X of the position coordinates of one of the position coordinates selected from a plurality of sets of the position coordinates after having been subjected to the conversion by the conversion matrix from the value of X of the position coordinates of the second set of position coordinates after having been subjected to the conversion by the conversion matrix exceeds, for example, zero as the reference value, then it will follow that the X-axis direction of the coordinate system of the sensor system is in agreement, for example, with the X-axis direction of the right-hand robot coordinate system. In contrast, if the transfer direction of the transfer device 10 (the rightward direction in FIG. 6) in the coordinate system of the sensor system is a direction of negative movement in the X-axis direction, then the value resulting from the subtraction will be smaller than zero. As a result, it is made possible to readily and reliably adjust the robot controller to the position detection of the sensor system regardless of whether the sensor system adopts a right-hand coordinate system or a left-hand coordinate system.

In the above-described aspect, the X-axis direction is preferably the direction of movement of the object moved by the moving means.

In this case, it is made possible to readily and reliably obtain the second set of position coordinates whose position differ from the selected position coordinates only in the direction of movement by the moving means by moving the object or point by the transfer device and detecting the object or point that has been moved by the sensor system.

The above-described robot system preferably includes an input unit by which an input is made to the robot controller, in which the robot controller recognizes, based on the input to the input unit, whether the coordinate system of the sensor system is a right-hand coordinate system or a left-hand coordinate system.

According to this configuration, it is made possible to readily and reliably adjust the robot controller to the position detection of the sensor system regardless of whether the sensor system adopts a right-hand coordinate system or a left-hand coordinate system.

The above-described robot system preferably includes a moving means configured to move the object, in which the robot is configured to perform a predetermined task on the objects, and the objects have a small variation in dimensions thereof in a Z-axis direction perpendicular to the X-axis and the Y-axis.

Since the above-described robot system creates the conversion matrix that carries out the coordinate conversion in a plane that includes the X-axis and the Y-axis, it is made possible to more reliably adjust the robot controller to the position detection of the sensor system if the dimensional variations of the multiple objects in the Z-axis direction are small.

A coordinate conversion method of the second aspect is a coordinate conversion method for converting position coordinates detected by a sensor system into position coordinates in a robot coordinate system recognized by a robot controller, the method including: creating a conversion matrix for carrying out coordinate conversion in a plane including an X-axis and a Y-axis on position coordinates obtained by the sensor system based on sets of position coordinates of a plurality of objects or points obtained by the sensor system and sets of position coordinates in an X-axis direction and a Y-axis direction in the robot coordinate system of the plurality of objects or points obtained by bringing a touch-up section provided at a distal end of the robot controlled by the robot controller into contact with positions corresponding to the plurality of objects or points; and converting position coordinates detected by the sensor system by using the conversion matrix.

It should be noted that, whilst the position coordinates of the object O in the robot coordinate system 201 is obtained by bringing the end of the tool that is the touch-up section into contact with the object in the first embodiment and the second embodiment, another scheme for determining the position of the object O in the robot coordinate system 201 may be used. For example, detection data that allows detection of the positions of the objects O may be obtained by a sensor whose coordinate system is made to correspond to the robot coordinate system 201 and the sets of position coordinates of the objects O may be obtained based on the detection data.

Figure 11:
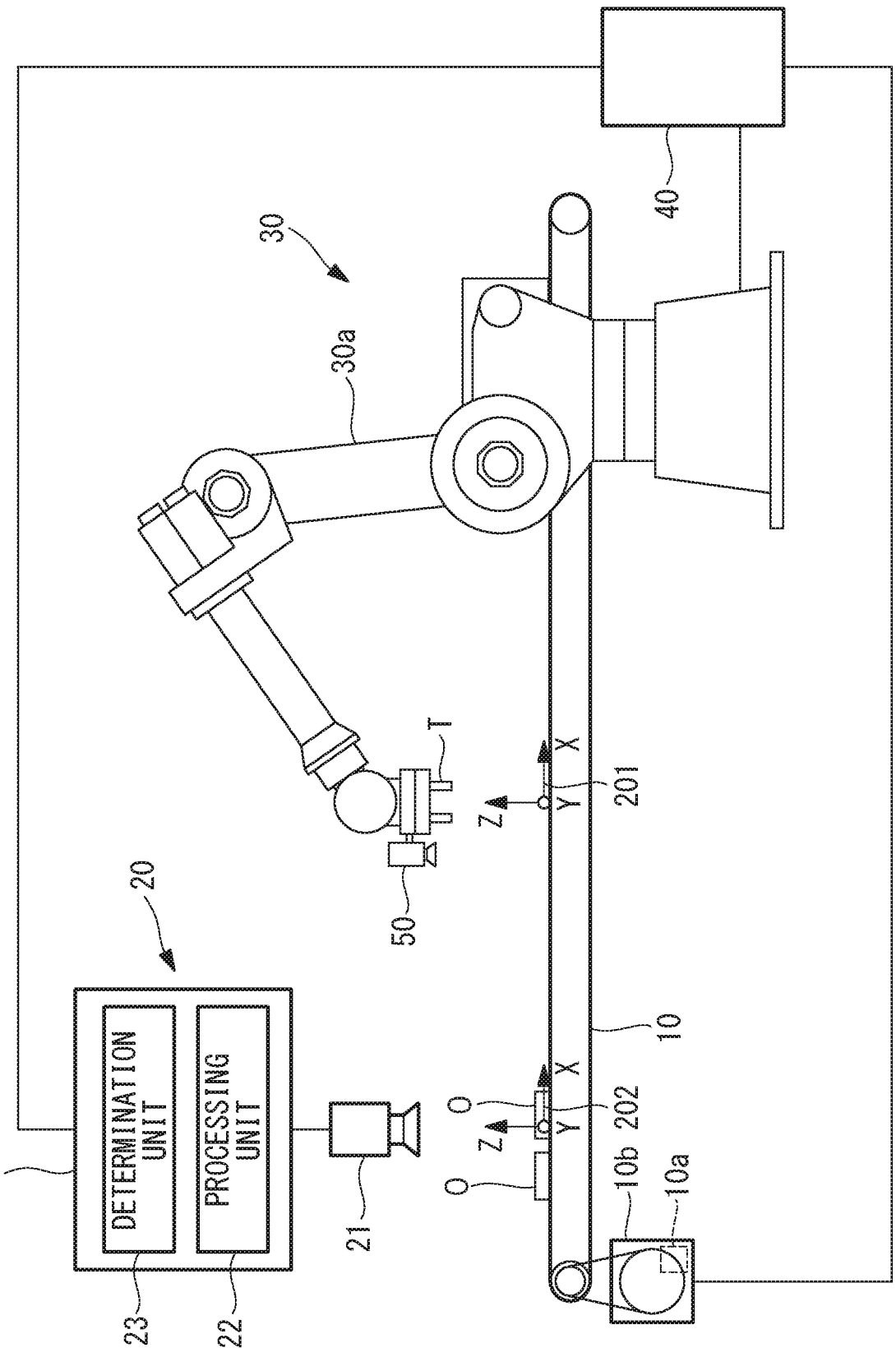
FIG. 11 is a diagram illustrating a configuration of a robot system of a modified example in which the detection systems of the first and second embodiments are used.

Specifically, as illustrated in FIG. 11, a sensor 50 that is a camera is attached, for example, to the distal end of the arm 30a of the robot 30, and the robot controller 40 acquires the sets of position coordinates of the objects O based on the image data obtained by the sensor 50. The sensor 50 is a two-dimensional camera, a three-dimensional camera, a three-dimensional distance sensor, etc.

For example, in steps S1-9 and S1-11, the sensor 50 may obtain detection data that is an image that includes the object O and the robot controller 40 may determine the set of position coordinates of the object O based on the detection data of the sensor 50. In this case, in steps S1-10 and S1-12, the sets of position coordinates of the objects O that have been obtained based on the detection data of the sensor 50 are stored in the storage unit 43. This also applies to steps S2-5 to S2-8, steps S3-13 to S3-16, and steps S4-5 to S4-8.

It should be noted that, the sensor 50 may be secured not to the robot 30 but to a frame or the like. In this case as well, the same effects as those that have been described above will be achieved if the correspondence is defined between the coordinate system of the sensor 50 and the robot coordinate system 201.

According to the above disclosure, it is made possible to carry out calibration between a robot and a sensor system manufactured by manufacturing companies of inspection devices and manufacturing companies of high-precision measurement instruments in relation to tasks performed by the robot.

The invention claimed is:

1. A robot system comprising:
a sensor system;
a robot; and
a robot controller which controls the robot, wherein
the sensor system is capable of detecting position coordinates of a first detection object in a state in which two or more detection objects are positioned in a detection area of the sensor system and the two or more detection objects other than the first detection object are intentionally hidden by a predetermined method;
the sensor system is capable of detecting position coordinates of a second detection object in a state in which the two or more detection objects are positioned in the detection area and the two or more detection objects other than the second detection object are intentionally hidden by the predetermined method; and
the robot controller is configured to conduct matrix creation processing to create a conversion matrix which conducts coordinate conversion, in a plane including an X-axis and a Y-axis, on a position obtained by the sensor system, based on the position coordinates of the first detection object, the position coordinates of the second detection object, and two sets of position coordinates in an X-axis direction and a Y-axis direction in the robot coordinate system, the two sets of position coordinates in the robot coordinate system corresponding to the first detection object and the second detection object, respectively.

2. The robot system according to claim 1, wherein the robot controller creates the conversion matrix based on the position coordinates of the first detection object, the position coordinates of the second detection object, and the two sets of position coordinates in the robot coordinate system obtained by bringing a touch-up section provided at a distal end of the robot into contact with positions corresponding to the first and second detection objects.

3. The robot system according to claim 2, further comprising:
a conveyor which moves the object; and
an encoder which measures an amount of movement of the object that is moved by the conveyor, wherein
the robot controller creates the conversion matrix, in the matrix creation processing, by using the position coordinates of the first detection object, the position coordinate of the second detection object, the two sets of position coordinates obtained by bringing the touch-up section into contact with positions corresponding to the first and second detection objects having moved by the conveyor after the two sets of position coordinates are obtained by the sensor system, and the amount of movement measured by the encoder.

4. The robot system according to claim 3, wherein the X-axis direction is a moving direction in which the object is moved by the conveyor.

5. The robot system according to claim 1, wherein the robot controller creates the conversion matrix based on the position coordinates of the first detection object, the position coordinates of the second detection object, and the two sets of position coordinates in the robot coordinate system obtained based on detection data of a sensor whose coordinate system corresponds to the robot.

6. The robot system according to claim 5, further comprising:
a conveyor which moves the object; and
an encoder which measures an amount of movement of the object that is moved by the conveyor, wherein
the robot controller creates the conversion matrix, in the matrix creation processing, by using the position coordinates of the first detection object, the position coordinates of the second detection object, the two sets of position coordinates obtained based on the detection data regarding the first and second detection objects having moved by the conveyor after the two sets of position coordinates are obtained by the sensor system, and the amount of movement measured by the encoder.

7. The robot system according to claim 1, wherein the conversion matrix conducts the coordinate conversion including rotation around a Z-axis perpendicular to the X-axis and the Y-axis.

8. The robot system according to claim 1, further comprising a conveyor configured to move the object, wherein
the robot controller receives a second set of position coordinates obtained by the sensor system, the second set of position coordinates identifying a position different from the position coordinates obtained by the sensor system in a moving direction of the conveyor;
the robot controller conducts coordinate conversion on the second set of position coordinates and at least one of the two sets of position coordinates by using the conversion matrix; and the robot controller performs determination processing to determine whether or not a difference in position in the X-axis direction between the position coordinates and the second set of position coordinates, which are subjected to the coordinate conversion, is equal to or smaller than a reference value.

9. The robot system according to claim 1, further comprising an operation panel for making input to the robot controller, wherein
the robot controller recognizes, based on the input to the operation panel, whether the coordinate system of the sensor system is a right-hand coordinate system or a left-hand coordinate system.

10. The robot system according to claim 1, further comprising a conveyor configured to move the object, wherein the robot performs a predetermined task on the objects.

11. A coordinate conversion method for converting a detected position detected by a sensor system into position coordinates in a robot coordinate system recognized by a robot controller, the method comprising:
detecting position coordinates of a first detection object in a state in which two or more detection objects are positioned in a detection area of the sensor system and the two or more detection objects other than the first detection object are intentionally hidden by a predetermined method;
detecting position coordinates of a second detection object in a state in which the two or more detection objects are positioned in the detection area and the two or more detection objects other than the second detection object are intentionally hidden by the predetermined method;
creating a conversion matrix which conducts coordinate conversion, in a plane including an X-axis and a Y-axis, on a position obtained by the sensor system based on the position coordinates of the first detection object, the position coordinates of the second detection object, and two sets of position coordinates in an X-axis direction and a Y-axis direction in the robot coordinate system, the two sets of position coordinates in the robot coordinate system corresponding to the first detection object and the second detection object, respectively; and
converting the detected position detected by the sensor system by using the conversion matrix.

12. A robot system comprising:
a sensor system;
a conveyor;
a robot configured to conduct a task on two or more parts or products transferred by the conveyor; and
a robot controller which controls the robot, wherein
the sensor system is configured to obtain an image of the two or more parts or products transferred by the conveyor and configured to perform image processing on the image for pass/fail inspection of the two or more parts or products;
the sensor system is capable of detecting two or more sets of position coordinates of the two or more parts or products based on the image to which the image processing is performed;
the robot controller is configured to conduct matrix creation processing to create a conversion matrix which conducts coordinate conversion, in a plane including an X-axis and a Y-axis, on a position obtained by the sensor system, based on the two or more sets of position coordinates of the two or more parts or products obtained by the sensor system and two or more sets of position coordinates in an X-axis direction and a Y-axis direction in the robot coordinate system, the two or more sets of position coordinates in the robot coordinate system corresponding to the two or more parts or products;

the robot controller receives a second set of position coordinates obtained by the sensor system, the second set of position coordinates identifying a position different from the position coordinates obtained by the sensor system in a moving direction of the conveyor;

the robot controller conducts coordinate conversion on the second set of position coordinates and at least one of the two sets of position coordinates by using the conversion matrix; and the robot controller performs determination processing to determine whether the coordinate system of the sensor system is a right-hand coordinate system or a left-hand coordinate system based on determination of whether or not a difference in position in the x-axis direction between the position coordinates and the second set of position coordinates, which are subjected to the coordinate conversion, is equal to or smaller than a reference value.

13. A coordinate conversion method for converting a detected position detected by a sensor system into position coordinates in a robot coordinate system recognized by a robot controller, the method comprising:

obtaining, by the sensor system, an image of two or more parts or products transferred by a conveyor;

performing, by the sensor system, image processing on the image for pass/fail inspection of the two or more parts or products;

detecting, by the sensor system, two or more sets of position coordinates of the two or more parts or products based on the image to which the image processing is performed;

creating a conversion matrix which conducts coordinate conversion, in a plane including an X-axis and a Y-axis, on a position obtained by the sensor system based on the two or more sets of position coordinates of the two or more parts or products obtained by the sensor system and two or more sets of position coordinates in an X-axis direction and a Y-axis direction in the robot coordinate system, the two or more sets of position coordinates in the robot coordinate system corresponding to the two or more parts or products;

converting the detailed position detected by the sensor system using the conversion matrix;

receiving, by the robot controller, a second set of position coordinates obtained by the sensor system, the second set of position coordinates identifying a position different from the position coordinates obtained by the sensor system in a moving direction of the conveyor;

conducting coordinate conversion on a second set of position coordinates and at least one of the two sets of position coordinates by using the conversion matrix, the second set of position coordinates obtained by the sensor system and identifying a position different from the position coordinates obtained by the sensor system in a moving direction of the conveyor; and determining whether the coordinate system of the sensor system is a right-hand coordinate system or a left-hand coordinate system based on determination of whether or not a difference in position in the x-axis direction between the position coordinates and the second set of position coordinates, which are subjected to the coordinate conversion, is equal to or smaller than a reference value.

* * * * *